United States Patent [19]
Hazzard et al.

[11] 3,780,676
[45] Dec. 25, 1973

[54] METALLIC RECOVERY SYSTEM
[75] Inventors: Noel D. Hazzard; William M. Anderson, both of Wellsville, N.Y.
[73] Assignee: The Air Preheater Company, Inc., Wellsville, N.Y.
[22] Filed: May 8, 1972
[21] Appl. No.: 253,673

[52] U.S. Cl.................. 110/8 A, 110/14, 110/49 R
[51] Int. Cl.............................................. F23g 5/06
[58] Field of Search...................... 110/8 A, 11, 14, 110/49 R

[56] References Cited
UNITED STATES PATENTS

| | | | |
|---|---|---|---|
| 2,836,901 | 6/1958 | Davis | 110/14 X |
| 3,362,887 | 1/1968 | Rodgers | 110/11 X |
| 3,098,458 | 7/1963 | Lantz, Jr. | 110/14 |
| 2,811,937 | 11/1957 | Bouchard | 110/49 X |
| 3,303,798 | 2/1967 | Kartinen et al. | 110/11 |

*Primary Examiner*—Kenneth W. Sprague
*Attorney*—Wayne H. Lang et al.

[57] ABSTRACT

A conversion system for waste having organic and inorganic components wherein the organic components are pyrolyzed in an essentially oxygen-free atmosphere so as to preclude the oxidation of the inorganic constituents. An afterburner provides the heat necessary for burning pyrolyzed gases and the carbonacious particulate matter produced in the pyrolyzing chamber. The pyrolyzing chamber is maintained at a suitable temperature for properly pyrolyzing waste material by tempering hot gases exhausting from the afterburner with cool ambient atmosphere, and then directing the mixed gases back over the pyrolyzing chamber.

8 Claims, 1 Drawing Figure

PATENTED DEC 25 1973　　3,780,676
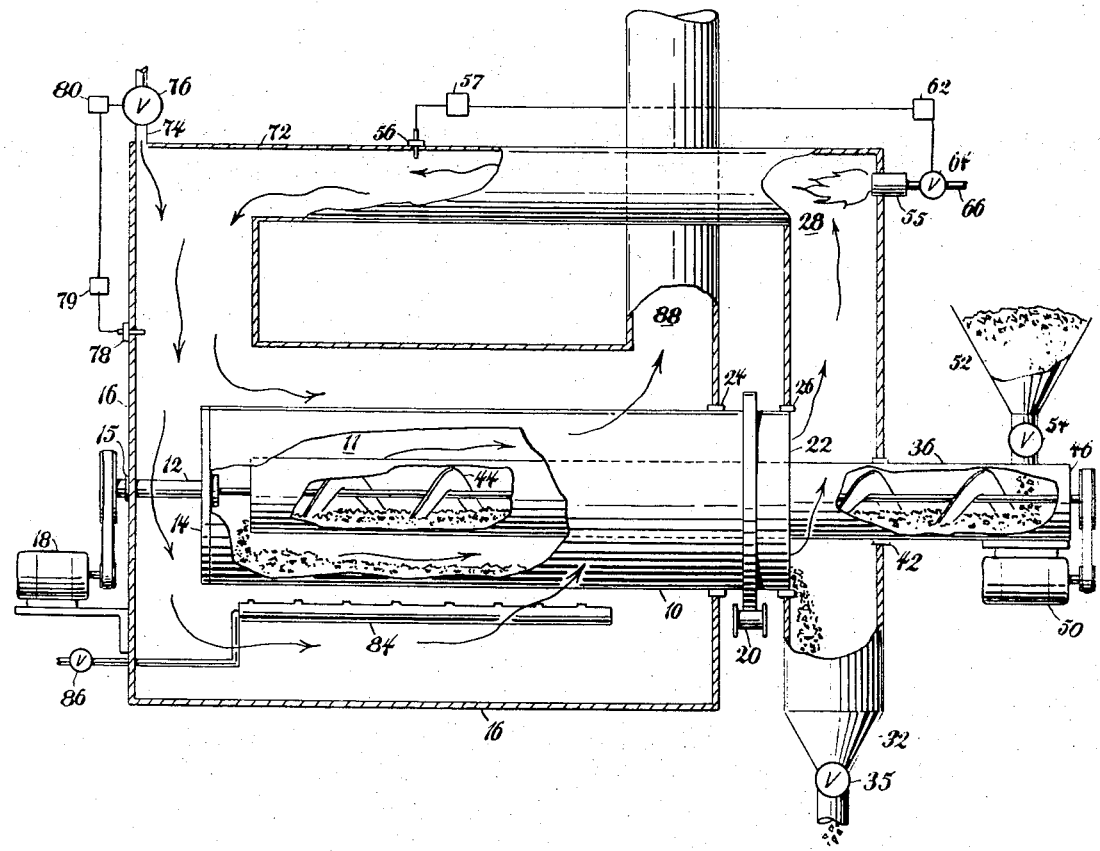

METALLIC RECOVERY SYSTEM

BACKGROUND OF THE INVENTION

1. Field of the Invention

The present invention relates to a system for the thermal conversion of waste that comprises primary and secondary combustion chambers wherein waste is pyrolyzed in the primary chamber to produce a gaseous exhaust that is burned by an afterburner in the secondary combustion chamber. The exhaust from the afterburner is ducted back over the primary combustion chamber to provide the heat necessary for pyrolyzation.

2. Description of the Prior Art

Incineration of waste material is frequently carried out in a manner represented by U.S. Pat. Nos. 3,491,707 and 3,547,056 wherein individually fired primary and secondary combustion chambers pyrolyze the waste material and then burn the gaseous exhaust given off therefrom. The temperature in the primary combustion chamber is usually regulated by controlling the oxygen flow for combustion in such a manner that it regulates the rate of combustion therein and thus the temperature in the combustion chamber. Inasmuch as oxygen for combustion creates an oxidizing atmosphere in the pyrolyzing chamber, the pyrolyzing of the aluminum or gold foil, circuit boards or photographic film not only pyrolyzes the organic constituents of the waste but it generates oxides of the metals which are given off as gaseous fumes so that the recovered metallic product is reduced both in quality and in quantity. Thus, conventional "starved-air" type incinerators are not deemed to be suitable apparatus where it is desired that residual metals be reclaimed for re-cycling or where pollution of the atmosphere be maintained at a minimum.

SUMMARY OF THE INVENTION

It is therefore an objective of the present invention to provide a system wherein pyrolyzation of waste material is carried out in a primary chamber that is maintained essentially free of all oxygen so that excessive metallic oxides are not formed to destroy the quality and reduce the quantity of the reclaimed metallic residue nor are metallic oxides exhausted to pollute the atmosphere.

In accordance with our invention we therefore provide a recovery system having a pyrolyzing chamber that is maintained essentially oxygen-free so that waste therein is heated indirectly by the hot exhaust gases of the afterburner. The afterburner is adapted to burn all the gases generated in the pyrolyzing chamber in addition to gas from an outside source that may be required to maintain a suitable temperature to combust the gases being discharged from the primary or pyrolyzing chamber. The temperature in the pyrolyzing chamber is in turn closely controlled by tempering the hot gases exhausting from the afterburner with cool ambient atmosphere so that it is maintained at what may be considered an optimum temperature for pyrolyzation of the waste involved. The pyrolyzation chamber comprises essentially a rotary hearth which is open at but one end for the loading of waste material therein and is heated indirectly so that there is insufficient air to provide the oxygen enriched atmosphere necessary for oxidation.

BRIEF DESCRIPTION OF THE DRAWING

The single FIGURE shows the schematic flow diagram of a waste reclamation system involving the concepts of the following invention.

DESCRIPTION OF THE PREFERRED EMBODIMENT

In the single FIGURE of the drawing the cylindrical drum 10 encloses a pyrolyzing chamber 11 that is mounted for rotation about its horizontal axis on a central shaft 12. The shaft 12 extends axially from an end wall 14 to a leakproof bearing 15 in the end wall of housing 16 so that there is no leakage of ambient air into the housing 16. Shaft 12 is in turn rotated by means such as indicated by a variable speed motor 18. The opposite end of the cylindrical drum 10 is mounted on vertically adjustable outside support bearings represented by numeral 20 whereby the drum 10 may be rotated about its axis and simultaneously displaced slightly from the horizontal so that the waste material therein is gently agitated and slowly moved away from the end wall 17.

The cylindrical drum has open end 22 opposite closed end 14 that extends through an opening having an annular packing 24 in housing 16 and into the opening in the afterburner chamber 28 that has an annular packing 26. The bottom of chamber 28 opens into a hopper 32 for the collection of residual matter being rejected from the pyrolyzing chamber whereby it may be periodically emptied of its contents through closure 35.

The cylindrical feeder 36 having an open end 38 at one end and an end plate 46 at the other extends horizontally through a wall of the afterburner and concentrically through the drum 10. The feeder 36 encloses a screw type device 44 that is rotatably mounted in a bearing at one end located in the center of end plate 46 and at the opposite end by a bearing in end wall 14. The screw is rotated slowly about its axis by a motor drive means 50 whereby waste material from hopper 52 being admitted to the feeder 36 is slowly moved laterally by the screw 44 through the cylindrical feeder 36 to the open end thereof where it is discharged into concentric chamber 11. Slow but continuous rotation of the cylindrical drum then causes the waste to move in a reverse direction toward open end 22 where it is discharged to hopper 32.

The drum 10 encloses a substantially airtight chamber 11 having no inlet for oxygen other than for oxygen that is entrained with waste material as it is supplied through the cylinder 36. An air lock such as a star wheel 54 subjacent hopper 52 further limits the flow of excess air through the cylindrical feeder 36 to that which is normally entrained in the waste material.

After being driven off from the organic waste in chamber 11, the pyrolyzed gas exhausts through the open end 22 of drum 10 and rises to supply the afterburner 55 where it is totally consumed in accordance with standard practice. Hot exhaust gases from the afterburner are continuously monitored by the thermocouple 56 having an indicator 57 and acting through controller 62 to maintain proper adjustment at valve 64 which controls the supply of additional fuel and air from a source 66 so that the gas is totally consumed by the afterburner. The controller 62 is set to provide fuel and oxygen necessary to the afterburner to provide temperature in exhaust duct 72 at suitable levels ranging from 1,200° to 1,600° F., the exact temperature depending upon the type of waste material being processed, the throughput desired, and the residence time of the hot gases in unit 72.

Hot exhaust gas from the afterburner exhausting through duct 72 is summarily directed over the outside of the cylindrical drum 10 so as to supply the heat necessary for pyrolyzation of the organic waste in the chamber 11. Inasmuch as the temperature in chamber 11 must be sufficient to obtain complete pyrolyzation of the waste material but not excessive so as to liquify the metallic wastes, the optimum temperature in the pyrolyzation chamber may vary from approximately 900° to 1,100° F. Therefore, the afterburner exhaust gases must be considerably cooled before being used. Accordingly, the cool ambient atmosphere as controlled by valve means 76 is fed into the afterburner exhaust through an inlet 74. The valve 76 in turn is controlled by thermocouple 78 acting through control means 80, while an indicator 79 at all times shows the true temperature of gases within the duct. Inasmuch as maintaining a suitable pyrolyzing temperature within chamber 11 is the purpose of thermocouple 78, it may be accordingly placed at various locations within housing 16 or even within the pyrolyzing chamber 11 to obtain the most accurate and rapid response.

In order that the temperature of the waste in the pyrolyzing chamber 11 may be raised quickly to a suitable pyrolyzing temperature, an auxiliary burner 84 having an independent source of fuel (not shown) controlled by valve means 86 is provided whereby the waste material in chamber 11 may be rapidly brought up to a suitable pyrolyzing temperature. When such a temperature has been achieved the burner may be shut off completely and sufficient heat supplied by the heat in the hot gases from afterburner 28.

After the hot exhaust gases from the afterburner circulate over the outside of drum 10 and transmit heat to the waste material in chamber 11, the then cooled gases are exhausted through stack 88 to the atmosphere.

In operation the burner 55 is at first lighted to provide hot exhaust gas that flows through duct 72 to housing 16 and over cylindrical drum 10 to the exhaust stack 88. After a build-up to the proper temperature, waste material including organic and metallic components is advanced by screw feeder 44 through tube 36 to the interior of chamber 11 where the rotation of drum 10 is instrumental in moving it laterally back toward open end 22. As the material is moved slowly back toward end 33, it is indirectly heated by the hot exhaust gas from burner 55 to a temperature of pyrolyzation whereby the gaseous constituents are driven off through open end 22 to mix with the flame of afterburner 55. As the pyrolyzed gas from chamber 11 supplements the gas from source 66, the thermocouple 56 acting through controller 62 and valve 64 is instrumental in modulating the fuel and air being supplied to the burner 55 in such a manner that as the pyrolyzed gas increases the flow of gas through valve 64 is decreased thus maintaining a predetermined temperature in duct 72 sufficient to effect complete combustion of the gases admitted to the afterburner.

While a temperature of from 1,200° to 1,600° F. may be desirable in duct 72 to obtain complete combustion of the fumes from afterburner 28, a somewhat lower temperature of from 900° to 1,100° F. is desirable in housing 16 in order that corrosion of the drum 10 and shaft 12 is retarded, and in order that metallic constituents of the waste material in chamber 11 will not be reduced to a molten condition.

Accordingly bleed valve 76 is adapted to respond to thermocouple 78 to maintain a suitable temperature in housing 16. Thus, if the thermocouple 78 should sense excessive temperature in said housing, the valve 76 will be moved toward "open" to allow a greater flow of cool ambient air and a lowering of the temperature.

Inasmuch as the type of wastes, their chemical constituency and throughput desired may vary widely, each burn should be inspected to see if satisfactory results are being achieved. Thus thermocouple 56, for example, be set at 1,300° F. and thermocouple 78 at 900° F. for preliminary operation. If observation of the metallic waste being exhausted to hopper 32 should show the presence of non-pyrolyzed organic matter, the temperature in chamber 11 may be increased by decreasing the amount of cool ambient air being introduced through duct 74. Moreover, the residence time of waste material in chamber 11 may be increased by slowing the speed of rotation of drum 10 or even decreasing its angle of inclination so that it is displaced from horizontal to a lesser degree.

While this invention has been described with reference to the accompanying drawing, it is readily understood by those skilled in the art that such invention permits modification within the scope of the appended claim.

We claim:

1. A pyrolyzation system for the recovery of metallic residue from waste material that contains organic and metallic components comprising in combination a cylindrical drum with an open end and a closed end enclosing a primary chamber for the pyrolyzation of waste material therein, means for rotating the drum about its axis, means for supplying a quantity of waste material into the open end of said drum, a secondary chamber, an afterburner in said secondary chamber, means supplying a quantity of fuel and air to the afterburner, means directing gas generated in the primary chamber to the afterburner, and a passageway directing the flow of hot gas exhausting from the afterburner over the outside wall of the cylindrical drum whereby waste material therein is heated to a state of pyrolyzation by the transfer of heat in the gas exhausting from the afterburner to the atmosphere through the walls of the cylindrical drum.

2. A system for the recovery of metallic residue as defined in claim 1 including means cooling the gas exhausting from the afterburner to control the temperature of the exhaust gas circulating over the outside wall of the cylindrical drum thus regulating the pyrolyzation of waste material within the cylindrical drum.

3. A system for the recovery of metallic residue as defined in claim 2 wherein the means for cooling the gas exhausting from the afterburner comprises a passageway supplying ambient air to the gas exhausting from the afterburner, and means responsive to temperature of a mixture of said ambient air and gas to control the flow of ambient air into said exhaust gas.

4. A system for the recovery of metallic residue as defined in claim 1 wherein means for supplying a quantity of waste material into the cylindrical drum comprises a tubular housing that extends concentrically through said drum.

5. A system for the recovery of metallic residue as defined in claim 4 including a screw type feeder inside said tubular housing, and means for rotating said screw type feeder to deliver waste material through said tubular housing adjacent to the closed end of the primary chamber.

6. A system for the recovery of metallic residue as defined in claim 5 including a hopper arranged to supply waste material to the tubular housing, and an air lock intermediate the hopper and the tubular housing, and an air lock intermediate the hopper ant the tubular housing adapted to limit excessive air flow into the primary chamber whereby waste material therein is heated in an atmosphere having a low oxygen content.

7. A system for the recovery of metallic residue as defined in claim 6 having the cylindrical drum displaced from its horizontal axis whereby rotation of said drum will advance the waste material therein toward the open end thereof.

8. A system for the recovery of metallic residue as defined in claim 6 including a hopper subjacent the open end of the cylindrical drum adapted to receive residue that is rejected from the open end of said drum.

* * * * *